United States Patent [19]
McGinnis

[11] 3,847,022
[45] Nov. 12, 1974

[54] SLURRY SAMPLER FOR POLYMER SEPARATION

[75] Inventor: Floyd H. McGinnis, Broken Arrow, Okla.

[73] Assignee: Seismograph Service Corporation, Tulsa, Okla.

[22] Filed: May 29, 1973

[21] Appl. No.: 364,594

[52] U.S. Cl.................. 73/421 R, 34/145, 100/90, 159/2 E, 425/86
[51] Int. Cl. ............................................ G01n 1/10
[58] Field of Search .......... 73/421 R, 421 B, 422 R, 73/422 TC; 100/90; 159/2 E, 30, DIG. 10; 425/86; 34/68, 143, 145

[56] References Cited
UNITED STATES PATENTS

| 3,027,652 | 4/1962 | Wallace | 34/68 |
| 3,217,783 | 11/1965 | Rodenacker | 159/2 E |
| 3,253,892 | 5/1966 | Brighac | 159/2 E |
| 3,442,317 | 5/1969 | Weiland | 159/2 E |
| 3,579,728 | 5/1971 | Reid et al. | 425/86 |

*Primary Examiner*—S. Clement Swisher
*Attorney, Agent, or Firm*—William F. Norris

[57] ABSTRACT

A method and apparatus are provided for obtaining a representative sample of a slurry of solid polymer particles in a hydrocarbon suspending agent from a polymer reactor or product line and for extracting the polymer particles from the hydrocarbon suspending agent by a flashing process. The solid polymer particles are passed through an evacuated extruder wherein the volatilized suspending agent is drawn off and the solid polymer particles are compacted to form a polymer extrudate which may be analyzed for process evaluation or control.

10 Claims, 3 Drawing Figures

SLURRY SAMPLER FOR POLYMER SEPARATION

BACKGROUND OF THE INVENTION

This invention relates to the separation of solid polymer particles from a slurry of solid polymer particles in a hydrocarbon suspending agent. And more particularly to a method and means for separating solid polymer particles from a slurry in a shorter period of time than has heretofore been possible.

In the preparation of solid polymers, it is desirable to control the polymerization reaction so as to provide polymers having constant and desirable properties. One property which has been found convenient for controlling the polymerization is that of melt index as determined according to ASTM Test D-1238-70. Although the property of melt index is a satisfactory control property for most solid polymers, the time consumed in separating the solid polymer particles from a sample of the slurry taken from the reactor or product line has been such that the conditions in the reactor at the time the melt index determination has been completed are not necessarily the same conditions prevailing at the time the sample was taken and therefore accurate control of the polymerization process has been hampered by the delay in obtaining a determination of melt index of the polymer contained in a sample of the slurry from the reactor or product line. It has heretofore been necessary to operate the polymerization reactor by experience based on knowledge of what happened in the reactor 8 to 12 hours in the past. Any deviation from a set of conditions known to produce a desired result would result in several hours production of off-specification product. The testing of different operating conditions within the reactor was precluded as a practical matter.

U.S. Pat. Nos. 3,506,640 and 3,579,728 disclose a method and means for separating a solid polymer from a solution of said polymer in a solvent wherein the sample solution is withdrawn from the polymerization reactor or from the product line through a sampling conduit and thence through a temperature controlling unit and then to an intermittently operated expansion valve where it is flashed directly into an evacuated extruder. The solvent vaporizes as the solution is flashed into the extruder and is removed therefrom so that a substantially solvent-free polymer extrudate is obtained. This prior art technique is suitable for use in low pressure ethylene polymerization reactors using the Phillips-type catalyst process wherein the polymerizations are carried out in hydrocarbon solutions at temperatures around 100° C and above and reactor pressures around 500 psi. In the Phillips process, the polymer dissolves as it is formed and at normal polymer concentrations the solutions obtained from the reactor are quite fiscous and must be kept hot.

The foregoing prior art method, while suitable for a Phillips-type process, cannot be used for sampling the product from a reactor using a Ziegler-type process (see: Ziegler, et al Angew Chem., 67, 541 [1955]) wherein the polymerization is carried out in a stirred reactor having a reactor temperature of about 70° C and pressure of about 75 psi. The critical difference between the Phillips process and the Ziegler process, insofar as sampling techniques are concerned, is that the product from a Phillips process reactor is a solution of polymer dissolved in a solvent at conditions of relatively high temperature and pressure. In contrast, the product from a Ziegler process reactor in a slurry of solid polymer particles of varying size in a hydrocarbon suspending agent and at relatively lower temperature and pressure. The nature of the polymer slurry obtained from the Ziegler process is such that the solid polymer particles tend to settle out of the hydrocarbon suspending agent unless turbulent flow conditions are maintained. Since the polymer solution of the Phillips process does not have solid suspended particles, a sample of the solution can be withdrawn from the reactor or product line through a small sampling conduit and carried through a temperature controlling element and then metered directly into an evacuated extruder through a flashing nozzle. When the prior art method disclosed in the above noted patents is applied to a Ziegler process reactor or product line, satisfactory operation cannot be obtained due to settling of the solid polymer particles within the sampling conduit and within the heat exchanger resulting in plugged lines, valves and other operational difficulties.

A method and means has been discovered whereby a slurry of solid polymer particles in a hydrocarbon suspending agent is substantially vaporized. The polymer particles and the vaporized hydrocarbon suspending agent are flushed through the heat exchanger by a carrier gas and into an evacuated screw extruder where the polymer sample is devolatilized and compressed and carrier gas removed to form a hydrocarbon-free extrudate which is obtained in 5 to 10 minutes after the slurry leaves the reactor or product line whereas previously a hydrocarbon-free sample was obtained only after an 8 to 12 hour delay.

It is an object of the present invention to provide an improved method and means for recovering solid polymer from a slurry of solid polymer particles in a hydrocarbon suspending agent.

It is a further object of the present invention to provide a method and means for recovering a solid polymer from a slurry of solid polymer particles in a hydrocarbon suspending agent in substantially less time than has heretofore been possible.

BRIEF DESCRIPTION OF THE DRAWINGS

The accompanying drawings, given as nonrestrictive examples, will enable the manner in which the invention is put into practice to be better understood. In the accompanying drawings.

DESCRIPTION OF THE PREFERRED EMBODIMENT

Figure 1:
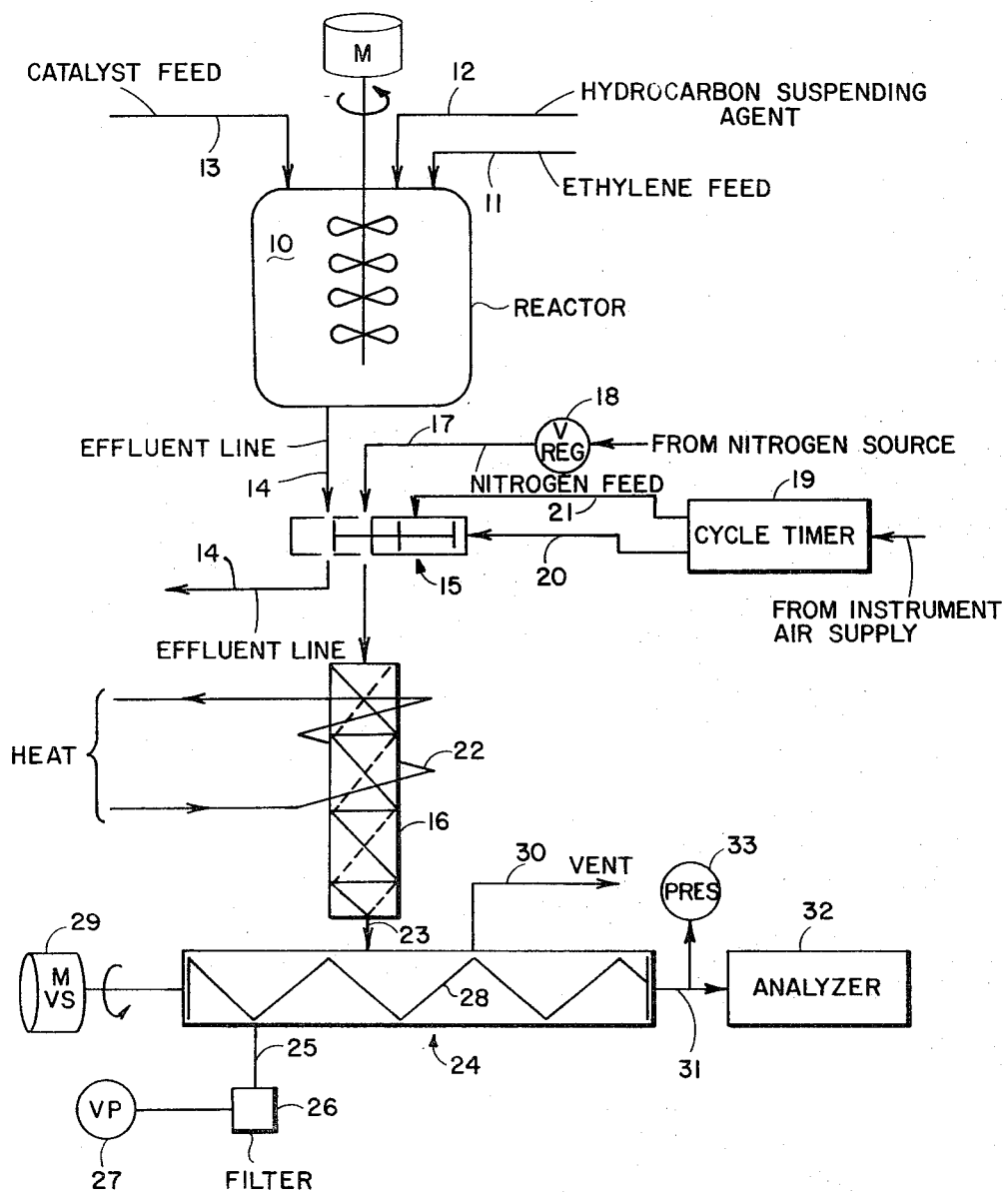
FIG. 1 is a schematic flow diagram of the invention.

With reference now to FIG. 1, the invention will be described as applied to a Ziegler process for polymerization of ethylene wherein the hydrocarbon suspending agent may be N-hexane and in the presence of a catalyst of, for example, aluminum triethyl plus a titanium derivative such as tetrachloride. In the Ziegler process, the polymerization reaction is often carried out at a temperature of about 70° C and at a pressure of about 75 psi. The ethylene feed to polymerization reactor 10 is through conduit 11, the N-hexane hydrocarbon suspending agent feed is through conduit 12 and the pre-mixed catalyst feed is through conduit 13. Temperature control of reactor 10 may be by means of reflux operation of the reactor with suspending agent - ethylene recycle, not shown. The polymer slurry effluent is removed through effluent line 14.

A sample of the slurry effluent is withdrawn from effluent line 14 by slurry sampler 15 and flushed into the inlet of heat exchanger 16 by nitrogen carrier gas which is introduced into sampler 15 through nitrogen feed conduit 17 and flow regulator valve 18. Elevated temperature and lower pressure conditions existing within heat exchanger 16 combine to volatilize the polymer slurry almost immediately upon its introduction into the heat exchanger. The flow of nitrogen carrier gas serves to keep the polymer particles in a fluid condition as they progress towards screw extruder 24. The function of the carrier gas is to fluidize and transport the solid particles and while nitrogen is preferred for the carrier gas because of its inertness and ready availability, any gas which would not, when mixed with the volatilized suspending agent, form a combustible mixture would be suitable. A cycle timer 19 is operatively connected to sampler 15 by control air lines 20 and 21 so as to sample the slurry in effluent line 14 intermittently at a constant rate determined by the control setting (not shown) of cycle timer 19.

Heat is transferred into heat exchanger 16 by means of coil assembly 22 having a heated fluid such as steam or oil circulated therethrough. Sufficient heat is applied to the slurry sample while it progresses through heat exchanger 16 to overcome the temperature drop due to expansion as the slurry sample is withdrawn from pressurized effluent line 14 and flushed into the lower pressure conditions existing within heat transfer unit 16, and sufficient excess heat is applied to the slurry sample to assure the nearly complete volatilization of the hydrocarbon suspending agent within heat exchanger 16. Satisfactory operation can be obtained when the temperature within heat exchanger is maintained near the boiling point of the hydrocarbon suspending agent; preferably the temperature is maintained at about 10° F. below the boiling point of the hydrocarbon suspending agent. It has been found that better compaction is obtained with slightly damp particles and therefore it is preferable that the polymer particles be slightly damp as they enter the extruder rather than obtaining complete volatilization of the hydrocarbon suspending agent in the heat transfer unit. The flow of nitrogen flushing gas carries the damp polymer particles and the now volatilized hydrocarbon suspending agent from the exit end of heat exchanger 16, through a transfer tube 23 into evacuated screw extruder 24.

Extruder 25 is maintained at a temperature within the range of about 400° F. to 500° F., depending upon the characteristics of the polymer being processed, by means of conventional electrical heating elements surroudning extruder 24, but not shown. The volatilized hydrocarbon suspending agent and the nitrogen carrier gas are removed from extruder 24 by means of evacuated conduit 25, through filter 26 and vacuum pump assembly 27. The solid polymer particles are carried toward the discharge end of extruder 24 by the advancing flights of extruder screw 28 which is driven by external variable speed motor 29. Any residual of the hydrocarbon suspending agent or of the nitrogen carrier gas that may be carried along with the solid polymer particles by the advancing flights of the extruder screw are vented off through vent conduit 30, which may be vented to the atmosphere.

The devolatilized polymer particles are carried along by the advancing flights of extruder screw 28 toward the discharge end of extruder 24 where they are compressed and extruded as solid polymer. The solid polymer extrudate from the discharge end of extruder 24 is then passed through discharge nozzle 31 to analyzer 32. A pressure gauge 33 indicates to an operator that the sampling rate of sampler 15 is sufficient to provide a continuous flow of extrudate to analyzer 32. Sampling rate is controlled by manual setting of cycle timer 19. Analyzer 32 can be any instrument for determining a variable property of the polymer. The melt index is a variable property of a normally solid polymer which is useful for control of the polymerization process. A melt index rheometer which is suitable for use with the present invention is described in U.S. Pat. No. 3,048,030.

Figure 2:
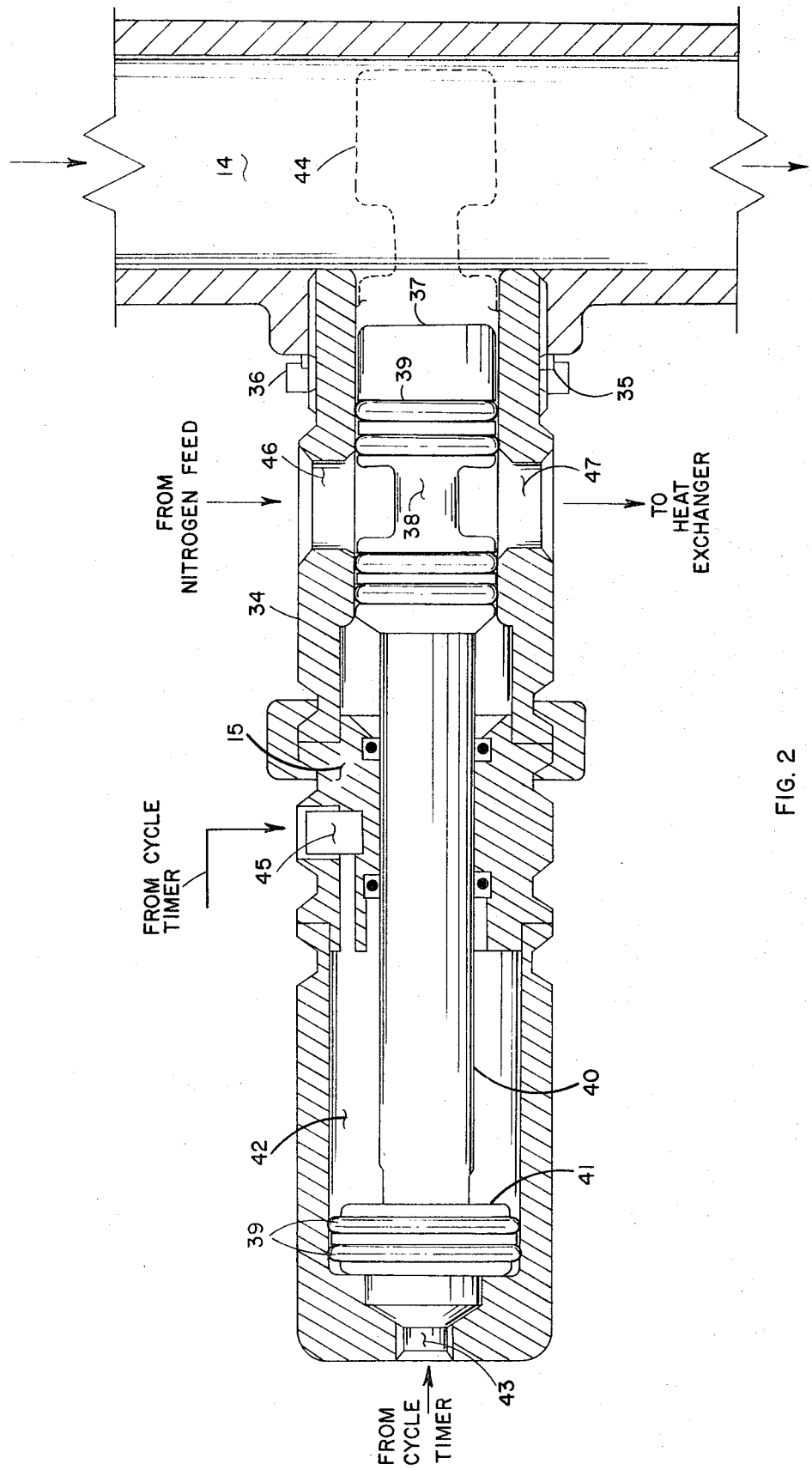
FIG. 2 is a detailed cross sectional view of the slurry sampler used to withdraw a representative sample of polymer slurry from a product line.

With reference now to FIG. 2, slurry sampler assembly 15 will be described in greater detail.

Slurry sampler 15 comprises a spool-type sampling valve intermittently actuated by a cooperating air cylinder and piston assembly. As shown in FIG. 2, the elements of the slurry sampler comprise a sampler cylinder 34 screwed into a "T" fitting in effluent line 14 and secured by seal 35 and lock-nut 36, plunger assembly 37 is slidably mounted in sampler cylinder 34 and has an accurately dimensioned spool section 38 therein for entrapping a slurry sample. Leakage around plunger 37 is prevented by seals 39. Piston rod 40 connects plunger assembly 37 to air piston 41 which is slidably mounted within air cylinder assembly 42. Operation of slurry sampler 15 is initiated by air pressure from cycle timer 19 via air line 20 to a first inlet port 43 in air cylinder 42. Air pressure acting on the face of air piston 41 urges piston rod 40 and plunger assembly 37 to an extended position as indicated by dashed line 44. In the extended position, the spool section 38 of plunger assembly 37 is exposed to the slurry effluent flowing through effluent line 14 and which is to be sampled. After a time, controlled by cycle timer 19, air pressure is released from air line 20 and applied to air line 21 which is connected to a second air cylinder inlet port 45 which is vented to the back side of air piston 41; plunger assembly 37 is thus urged back to its initial position as illustrated.

As plunger assembly 37 moves toward its initial position, a sample of slurry material is trapped within spool section 38. When plunger assembly 37 reaches its initial position, spool section 38 is in alignment with nitrogen inlet port 46 and with slurry outlet port 47 in sampler cylinder 34. Nitrogen feed line 17 terminates at nitrogen inlet port 46 and supplies a constant flow of nitrogen carrier gas which flushes the trapped slurry sample out through slurry outlet port 47 and into heat exchanger 16.

The rate of slurry withdrawal from effluent line 14 and into heat exchanger 16 is controlled by the volume of slurry trapped within spool section 38 and by the cyclical rate of operation of plunger assembly 37 which, in turn, is controlled by cycle timer 19. Manual control of sample flow rate is thus obtained by timing controls provided on cycle timer 19. It has been found that satisfactory operation can by had when the volume of spool section 38 is about 8 cubic centimeters and a cycling rate of 18 cycles per minute for a typical slurry withdrawal rate of about 144 cubic centimeters per minute and a nitrogen carrier gas flow of about 18 standard cubic feet per minute. Slurry withdrawal rate may vary over a range of 30 to 240 cubic centimeters per minute under various operating conditions and the carrier flow rate may be adjusted within a range of 5 to 35 standard cubic feet per minute to obtain adequate particle movement.

A slurry sampling valve suitable for use with the present invention is marketed by Bristol Engineering Company of Yorkville, Illinois, under their model number M-4KTAN. A cycle timer suitable for use with the slurry sampler is marketed by Eagle Signal Company of Davenport, Iowa, under model number CA10-0A5050501.

Figure 3:
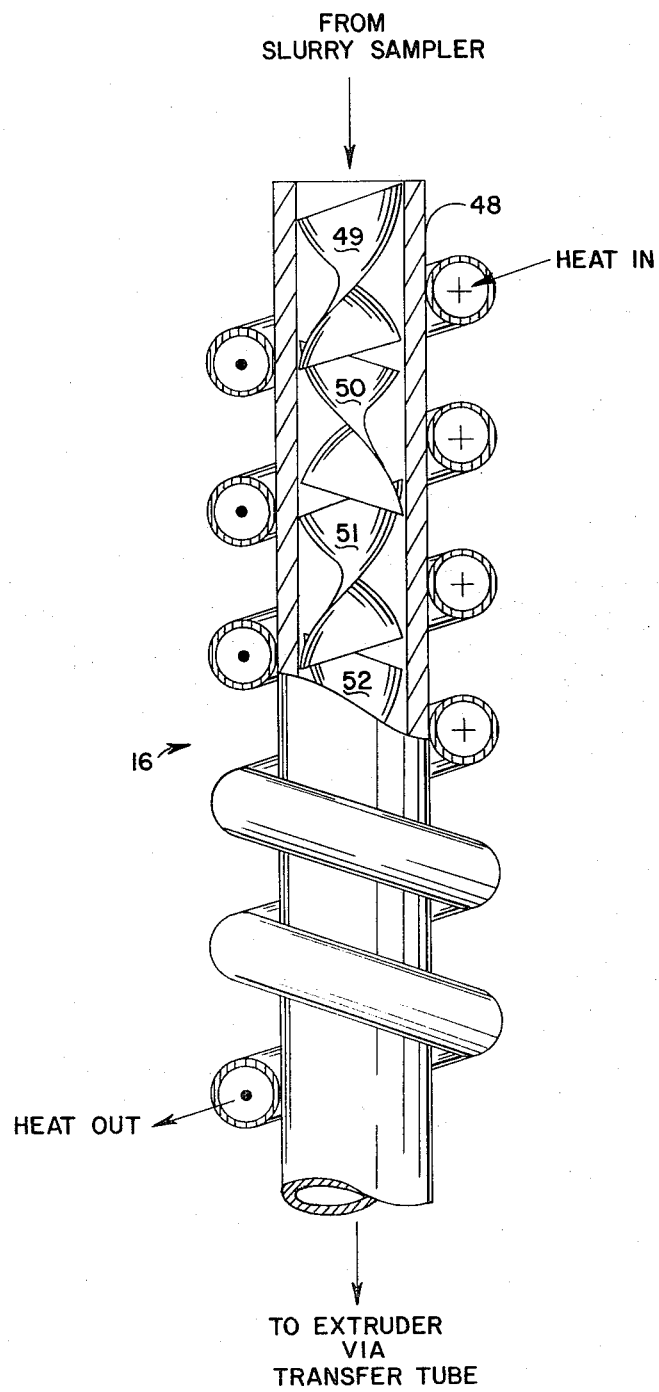
FIG. 3 is a more detailed partial cut-away view of the heat exchanger unit.

With reference now to FIG. 3, heat exchanger 16 will be described in greater detail.

Heat exchanger 16, shown in partial cross section in FIG. 3, comprises tubular housing 48 and heating coil 22. Tubular housing 48 encloses a series of fixed helical elements 49, 50, 51 and 52. Each of the helical elements is fabricated from thin sheet metal and has a 180° twist so as to impart a rotational circulation to material flowing through housing 48. Viewed from the input end, the first helical element 49, the third element 51 and each succeeding alternate element is, for example, twisted in a clockwise direction, while the second element 50, the fourth element 52 and each succeeding alternate element is twisted in a counterclockwise direction. Additionally, each of the elements is mounted, having its leading edge at right angles to the trailing edge of its preceding element, and thus the direction of rotational circulation of the material flowing through housing 48 is reversed at each section. In this matter, the material flowing through the mixer tube is continuously intermixed, resulting in virtual elimination of radial gradients in temperature, velocity and material composition.

A heating jacket comprising a spirally wound tubing coil 22 is in close contact with the outside diameter of tubular housing 48. A heated fluid such as steam or heated oil is crculated through coil 22 to provide a source of heat for raising the temperature of the material flowing through tube 48 to obtain substantially complete volatilization of the N-hexane suspend agent.

The Kenics Corporation of Danvers, Massachusetts, markets a STATIC MIXER[R] (registered trademark of Kenics Corporation), U.S. Pat. No. 3,286,992, which is suitable for use as the mixer assembly in the heat exchanger, in particular a Series 10 STATIC MIXER module having an I.D. of 0.62 inches, a length of 0.51 feet and containing 6 helical elements has been found to be satisfactory.

Figures 4, 5:
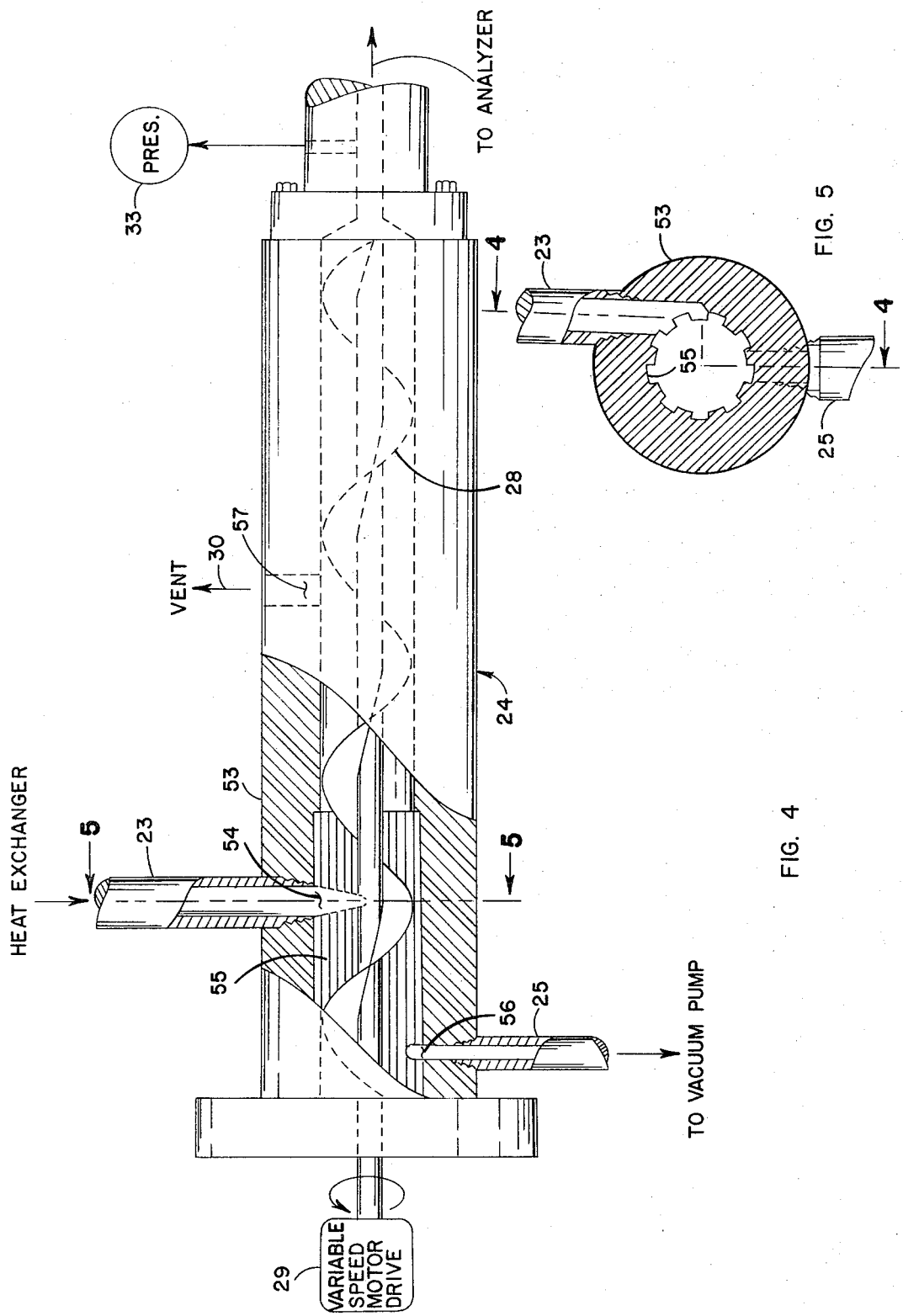
FIG. 4 is a detailed view of the screw extruder of the invention.
FIG. 5 is section along lines 5—5 of FIG. 4.

With reference to FIGS. 4 and 5, screw extruder 24 will be described in greater detail.

Screw extruder 24 comprises a cylindrical extruder barrel 53 about 17 inches long and having a one inch diameter hole bored along its axis, and having a helical extruder screw 28 closely fitting therein. A variable speed motor 29 rotates extruder screw 26 in a direction such that the flights of the screw advance from left to right with respect to FIG. 4. A feed inlet 54 is provided having transfer tube 23 attached therein. The center line of feed inlet 54 is disposed tangentially to the internal periphery of extruder barrel 53 as shown in FIG. 5. A series of grooves 55, about five inches along by 1/8 inch wide by 1/16 inch deep, are arranged parallel to the longitudinal axis of barrel 53. The grooved section of extruder barrel 53 aids extruder screw 28 in compacting the polymer particles into a solid material and removing it rapidly from the feed section. Vacuum outlet 56 is provided having vacuum conduit 25 attached therein and vent 57 is also provided having vent line 30 attached thereto. The downstream end of extruder barrel 53 has a 1/4 inch elongated nozzle 31 mounted thereon which conducts the polymer extrudate to analyzer 32. Pressure gauge 33 is provided on nozzle 31 for monitoring pressure of the polymer extrudate. Feed material from inlet 54 is fed substantially directly into the flights of extruder screw 28 and substantially parallel to the angular motion of the screw. Extruder screw 28 rotates clockwise with respect to FIG. 5 causing the screw flights to advance from left to right with respect to FIG. 4, so that the solid polymer particles are carried away from feed inlet 54 by the advancing flights of extruder screw 28. The vaporized hydrocarbon suspending agent and the nitrogen flushing gas travels countercurrently to the flow of the solid polymer particles and is withdrawn from the extruder by way of vacuum outlet 56 and vacuum conduit 25. Vacuum pump 27 of FIG. 1 is sized to maintain a vacuum in the range of 20 to 25 inches of mercury within extruder barrel 53 under operation conditions.

Feed inlet 54 is several extruder screw flights downstream, with respect to the direction of flow of polymer through the extruder (left to right in FIG. 4) from the drive end of the extruder, and the vacuum outlet 56 is then positioned two or three extruder screw flights upstream from the feed inlet 54. Vent 57 is positioned in extruder barrel 53 about seven or eight extruder flights downstream with respect to polymer flow and in the compression section of extruder 24. Any volatile material or carrier gas which is not drawn off through vacuum outlet 56 and vacuum conduit 25 and which may be carried downstream with the polymer particles by the advancing flights of extruder screw 28, are vented off to atmospheric pressure through vent 57 and vent line 30.

Temperature within the extruder will preferably be maintained sufficiently high to reduce the polymer viscosity to a value as low as practical, thus aiding in removing vapor from the polymer. The downstream end of extruder 24 is preferably maintained at a temperature sufficient to maintain the desired back pressure within discharge nozzle 31. It has been determined that an exturder temperature range of 400° F. to 500° F., depending upon the characterisitics of the particular polymer being processed, is satisfactory for obtaining the abovementioned objectives. Temperature within the extruder is maintained by electrical heating elements, of conventional design, surrounding the extruder barrel 53. The heating elements are not shown.

Although a preferred embodiment of the invention has been described in detail, it is to be understood that various changes, substitutions and alterations can be made in the steps of the invention without departing from the spirit and scope of the invention as defined by the appended claims.

What is claimed is:

1. A system for extracting solid particles from a slurry comprising:
   a heat exchanger for volatilizing the slurry suspending agent;
   means for compressing the solid particles having an evacuated interior for removing volatilized materials therefrom; and
   means for flushing the volatilized slurry through the heat exchanger and into the compressing means.

2. A system in accordance with claim 1 wherein the compressing means is a screw type extruder having a vacuum outlet for withdrawing volatilized and gaseous materials therefrom.

3. A system in accordance with claim 1 wherein the flushing means comprises a source of carrier gas and means for regulating a flow of said gas through the heat exchanger and compressing means.

4. A system according to claim 3 wherein the carrier gas is nitrogen.

5. A system for extracting polymer samples from the slurry effluent of a polymerization reactor comprising:

means for withdrawing a sample from the slurry effluent of a polymerization reactor;
   a heat exchanger arranged to receive the slurry sample from the withdrawing means and having heat applied thereto for volatilizing the slurry suspending agents;
   a screw extruder arranged to receive the volatilized slurry sample from the heat exchanger and having evacuating means for removing gaseous material from the interior of the extruder; and
   means for flushing the slurry sample through the heat exchanger and into the screw extruder.

6. A system in accordance with claim 5 wherein the flushing means comprises, in combination:
   a source of inert gas;
   means for directing a flow of inert gas through the heat exchanger and into the screw extruder; and
   means for regulating said flow of inert gas.

7. A system according to claim 6 wherein the inert gas is nitrogen.

8. A method of extracting a polymer sample from the slurry effluent of a polymerization reactor comprising:

withdrawing a sample of the slurry effluent;
   volatilizing the slurry suspending agent while flushing the sample through a heat exchanger with a flow of carrier gas; and
   removing gaseous and volatilized materials by vacuum pump means while compacting the solid slurry particles in a screw extruder to form a polymer extrudate.

9. The method of claim 8 wherein the sample is withdrawn intermittently at a constant rate to provide a continuous flow of polymer extrudate.

10. The method of claim 9 including the steps of measuring the pressure of the polymer extrudate at the discharge nozzle of the screw extruder and varying the sample withdrawal rate to maintain the polymer pressure at the discharge nozzle at a constant value.

* * * * *